United States Patent [19]
Chapin

[11] Patent Number: 4,998,356
[45] Date of Patent: Mar. 12, 1991

[54] CARPENTER'S TAPE MEASURE WITH PUSH ON-PUSH OFF LOCKING MECHANISM

[76] Inventor: David S. Chapin, 902 W. Johnson St., Raleigh, N.C. 27605

[21] Appl. No.: 429,487

[22] Filed: Oct. 31, 1989

[51] Int. Cl.⁵ .............................................. G01B 3/10
[52] U.S. Cl. ........................................ 33/767; 33/761; 242/84.8
[58] Field of Search ................. 33/767, 741, 770, 668; 242/84.8, 107.3

[56] References Cited

U.S. PATENT DOCUMENTS

| | | | |
|---|---|---|---|
| 2,684,534 | 7/1954 | Ljungberg | 33/767 |
| 3,041,004 | 6/1962 | Busch | 33/767 |
| 3,164,907 | 1/1965 | Quenot | 33/767 |
| 3,435,529 | 4/1969 | Quenot | 33/767 |
| 4,131,244 | 12/1978 | Quenot | 33/767 |
| 4,305,206 | 12/1981 | Roe | 33/770 |
| 4,449,302 | 5/1984 | Drechsler et al. | 33/767 |
| 4,663,854 | 5/1987 | Miller et al. | 33/767 |
| 4,729,171 | 3/1988 | Samson | 33/668 |
| 4,765,557 | 8/1988 | Kahmann | 33/767 |
| 4,856,726 | 8/1989 | Kang | 33/767 |

Primary Examiner—William A. Cuchlinski, Jr.
Assistant Examiner—C. W. Fulton
Attorney, Agent, or Firm—Kenyon & Kenyon

[57] ABSTRACT

A tape measure is disclosed wherein the measuring tape can be locked into, and unlocked from, a desired position by action of a "push on-push off" button mechanism.

12 Claims, 5 Drawing Sheets

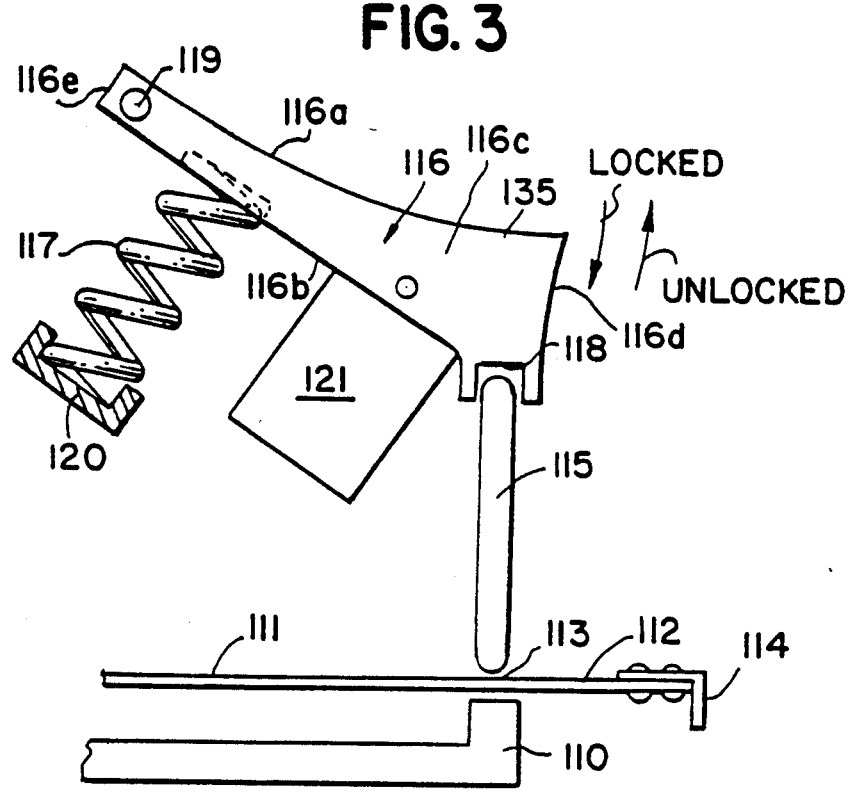
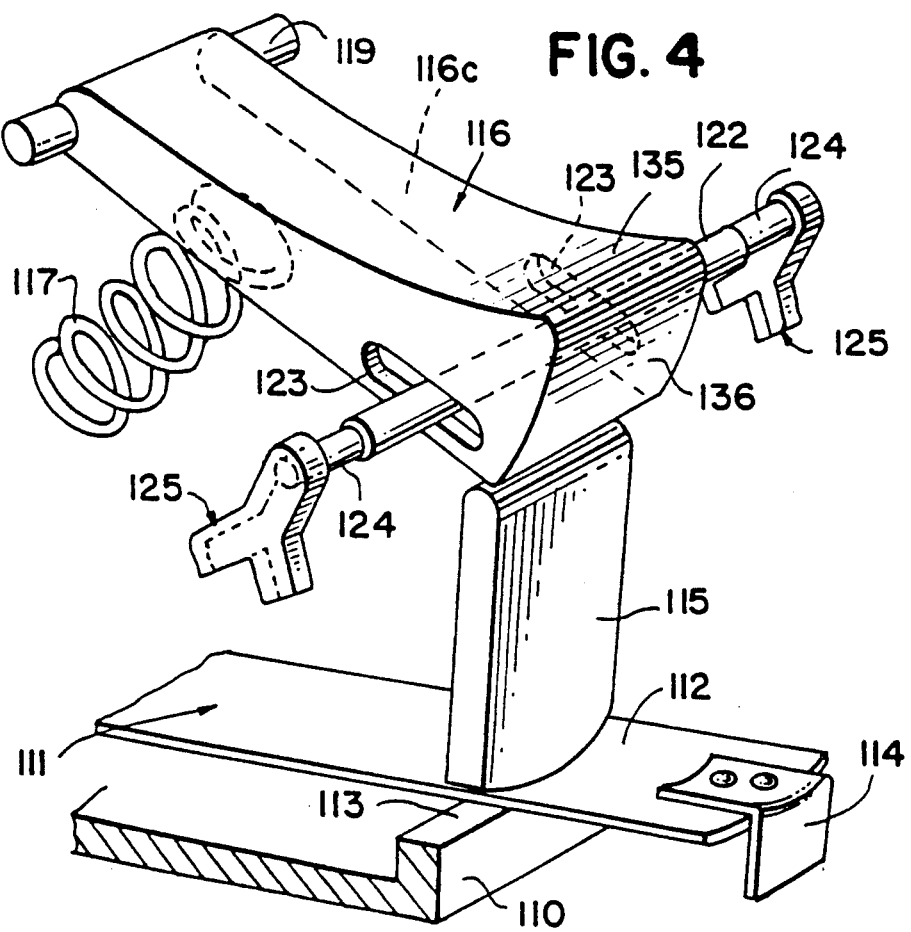

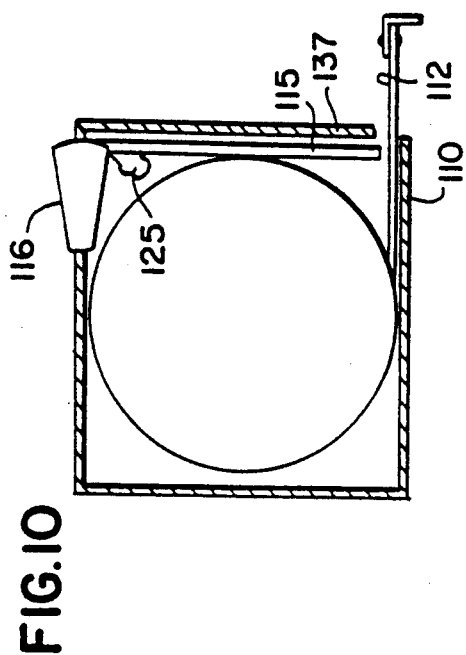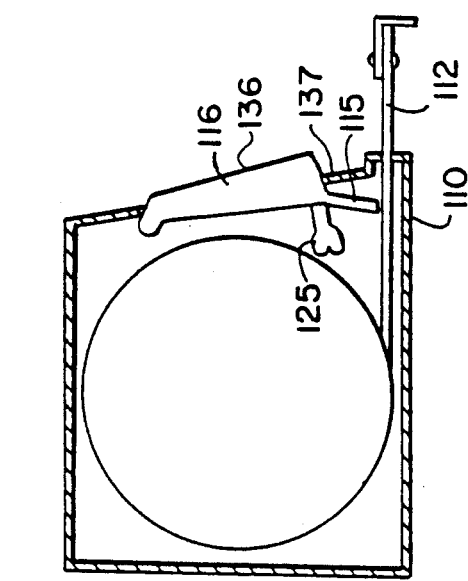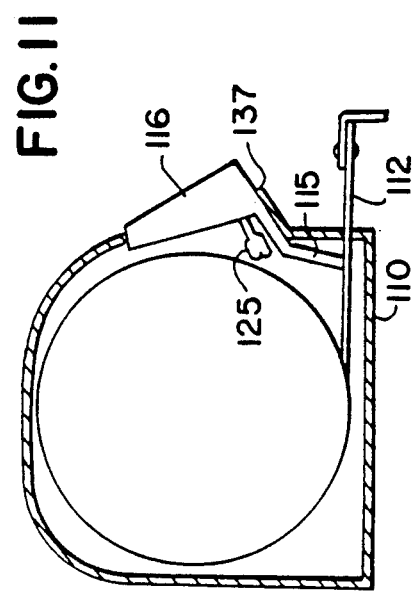

CARPENTER'S TAPE MEASURE WITH PUSH ON-PUSH OFF LOCKING MECHANISM

FIELD OF THE INVENTION

This invention relates to the construction of tape measures, particularly to the design of mechanisms for locking a measuring tape in a desired extended position.

BACKGROUND OF THE INVENTION

Carpenter's tape measures typically incorporate a spring-loaded rolled tape in a housing. When used, the tape or "blade" is extracted from the housing to the desired length for measurement. Most tape measures presently contain a mechanism for locking the measuring tape into a fixed position when it is extended at the desired length. These locking mechanisms have usually either a "slide" mechanism or a "toggle-type" mechanism.

In a typical "slide" mechanism, a button slides along a fixed path between a locked position and an unlocked position. As the button slides to the locked position, a lock shoe is gradually brought into contact with the tape measure blade. When the button is slid all the way into the locked position, the contact between the lock shoe and the blade is sufficient to press the blade against a portion of the tape measure housing, thus locking the blade in place at the desired length. The blade is then unlocked by sliding the button back to the unlocked position.

Slide lock mechanisms have presented several disadvantages. First, guide paths must be formed in the tape measure housing to guide the sliding button from position to position. Sliding tabs on each end of the button require recesses within the housing into which they can slide as the button is pushed in either direction. Providing such recesses requires a larger housing which is harder to grasp. Second, moving the sliding button is often awkward. It is difficult in many instances to hold the spring-loaded blade in its extended position while pushing the button down in the proper direction, since little leverage can be obtained without changing the position of the hand. Third, movement of the sliding button is not determinative of the position of the lock shoe with respect to the blade. To lock the blade, the sliding button must be moved far enough to cause sufficient contact by the lock shoe. However, it is often difficult to determine whether the button has been moved sufficiently. As a result, it is also difficult to determine whether the blade is locked in place without releasing either the blade or the hand holding the housing. Fourth, it is also difficult to determine where the finger or thumb is positioned with respect to the button by simply touching the button. The surface of the button must be felt to determine the position of the finger on the button before the user can be sure that movement of the finger will move the button in the desired direction. Finally, the lock shoe in sliding mechanisms usually meets the tape blade at less than the perpendicular and can push the blade a small distance back into the housing as the lock is engaged, thus changing the desired position of the blade. Typical slide mechanisms are disclosed in U.S. Pat. Nos. 3,689,004 and 3,716,201. Commercially available products using a sliding mechanism include Product No. 33-425 (available from Stanley Tools).

FIGS. 1 and 2 depict typical "toggle-type" locking mechanisms used in prior devices. One type of lock, as shown in FIG. 1, is movable between a locked and lock position. Once the leading end 12 of measuring tape 11 is extended out of housing 10 to a desired length, it can be locked in place by lock shoe 15 engaging the tape. Lock shoe 15 is slidably mounted within housing 10 between two constraining walls 32. Button 16 is mounted within housing 10 for rotation about button pivot 19 positioned approximately in the center of button 16. A cam surface 16a on button 16 is adapted for contacting the upper edge of lock shoe 15 and causing lock shoe 15 to engage the upper surface of measuring tape 11 to lock the tape in place when moved to a locked position.

In an "over center" lock, shown in FIG. 2, Button 16 and lock shoe 15 are connected at a notch 18 such that movement of button 16 moves lock shoe 15. During such movement, the point of button-lock shoe contact passes across the imaginary line between button pivot 19 and the point of lock shoe-measuring tape contact (i.e., the button-lock shoe contact point passes "over center") when moved to a locked position. Commercially available products incorporating these or similar mechanisms include Product No. Lufkin Y125 and 8425 (available from Coopertools Division, Cooper Industries).

Both toggle-type mechanisms are locked and unlocked by "toggling" button 16 between different positions by applying force to button 16 at two different points at the ends of the button, which causes button 16 to rotate about button pivot 19 in two different directions. To lock the mechanism, force is applied to point 33 on button 16, thus rotating button 16 about button pivot 19 in a clockwise direction (as shown in FIGS. 1 and 2). As button 16 rotates, lock shoe 15 is pressed against the upper surface of measuring tape 11, locking it in place. To unlock the mechanism, force is applied to a different point 34 on the opposite end of button 16, thus rotating button 16 about button pivot 19 in the opposite direction (counterclockwise in FIGS. 1 and 2).

Although toggle-type locking mechanisms in general perform better than sliding mechanisms, they also exhibit certain disadvantages. The most significant disadvantages are ergonomic disadvantages caused by the need to apply force at different points and in different directions. This arrangement requires awkward positioning and movement of the user's hand, particularly the thumb, to lock and unlock the device. Locking and unlocking may also require repositioning of the user's hand to contact the different points on the button or changing the user's grip to apply the necessary opposite forces. In use, such changes in position can cause the tape measure to move from the desired alignment with the object being measured, requiring repositioning of the tape measure to assure accurate measurement. Repositioning of the hand may be especially disadvantageous where the tape measure is used in tight spaces where repositioning of the hand may not be possible. Efficient operation of such a mechanism, like the sliding button mechanism, also requires that the user determine where a finger is located on the surface of the button. Placement of a finger on the button does not alone determine whether the mechanism can be activated in the desired fashion by movement of the finger without determining the finger's position on the button.

SUMMARY OF THE INVENTION

In accordance with the present invention, a tape measure is disclosed wherein the measuring tape can be locked into, and unlocked from, a desired position by action of a "push on-push off" button mechanism. Such a mechanism exhibits significant advantages over prior devices. Most importantly, the mechanism can be both locked and unlocked with the same motion and without need to reposition the user's hand to lock, unlock or change leverage on the button. In use, the user's hand remains in one position from which the locking mechanism button can be depressed in the same manner to both lock and unlock the tape measure. Therefore, the locking process is more comfortable and practical for the user. Such mechanisms also obviate the need for determination of finger position on the button to insure the mechanism can be activated. Since such mechanisms are locked and unlocked by the same finger motion, most any placement of the finger on the button will allow both locking and unlocking of the mechanism. The push on-push off mechanism also leaves no doubt as to whether the lock is engaged with the blade if the button is depressed. When the button is depressed the mechanism clicks into the locked position, without need to determine whether the lock shoe has been sufficiently contacted with the blade. These and other advantages of the devices of the present invention will become apparent from the following description.

The type of "push on-push off" button mechanism contemplated herein operates in one of two ways. In the first type, the button starts in a "resting position" which corresponds to the "off" or "unlocked" condition. Usually, the button is held in the resting position by a resistive force, such as that provided by a spring, that opposes depression of the button. When pressure is applied to depress the button, the button moves to and is locked into an "activated" position which corresponds to the "on" or "locked" condition and the mechanism is placed into the "locked" condition. As the button is released it remains in the activated position (i.e., partially depressed). A second depression of the button in the same direction as the first depression unlocks the mechanism and returns it to the resting position. In the second type of button mechanism, the button starts in the same resting position. When the button is first depressed, it moves to the activated position and the mechanism is placed into the "on" or "locked" condition. However, when the button is released it returns to the resting position while the mechanism remains in the "on" or "locked") condition. A second depression of the button to the activated position unlocks the mechanism which returns to the "off" or "unlocked" condition when the button is again released. Throughout the movements of the button, the position of the button and its effect upon the locking mechanism are dictated by means within the mechanism for directing the button to the resting and activated positions. Usually, the button is fitted with engaging means, such as pins on or inserted into the button, for engaging the directing means and guiding the button over the desired path.

Regardless of the operation of the specific mechanism, however, any tape measure in which successive applications of force to the button at the same point on the button, and in the same direction with respect to the button pivot point, will alternate the locking mechanism between the locked and unlocked conditions is within the scope of the present invention.

The above is a brief discussion of certain features of the invention and deficiencies of the prior art. Other feature will be apparent to those skilled in the art from the detailed discussion of the preferred embodiment which follows.

BRIEF DESCRIPTION OF THE FIGURES

FIGS. 3 and 4 depict a locking mechanism in accordance with the present invention.

FIGS. 8-11 depict alternative embodiments of the present invention having the button and lock shoe in different positions within the tape measure housing.

DETAILED DESCRIPTION OF THE INVENTION

Figure 5:
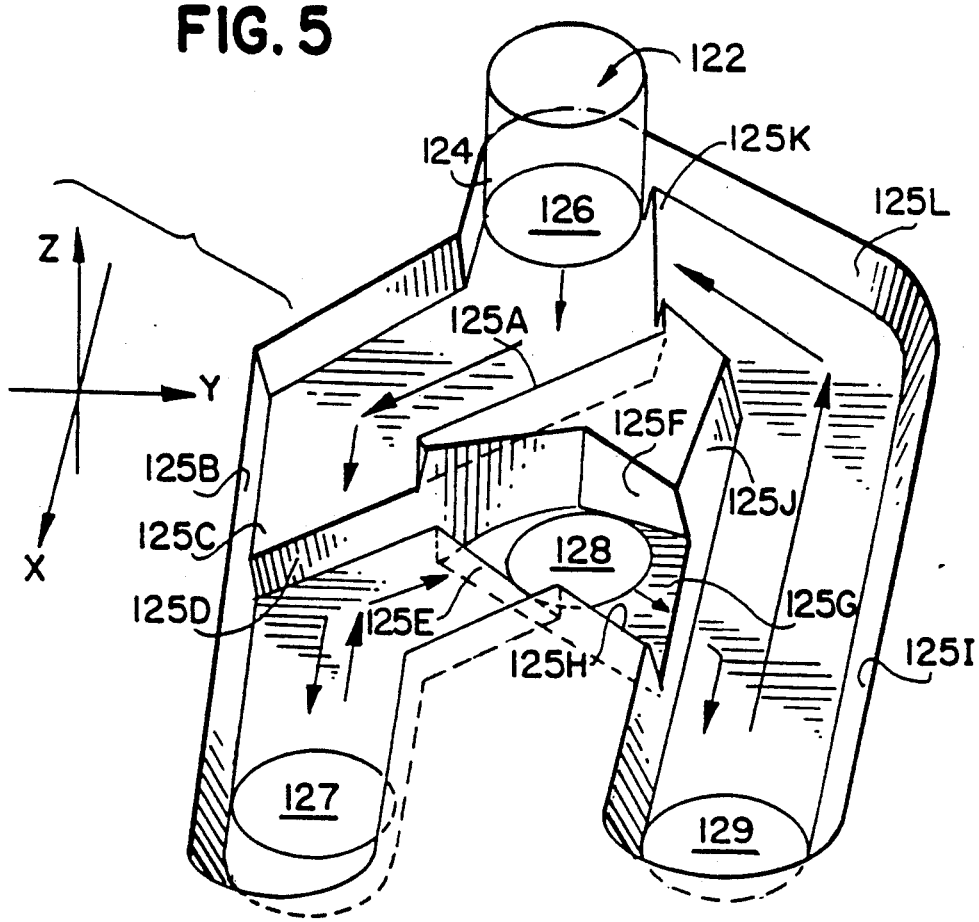
FIG. 5 shows the detailed structure of a Y-groove used in a preferred embodiment of the present invention.

With reference to FIGS. 3-5, one embodiment of a tape measure of the present invention comprises a hollow housing 110 which is adapted for containing coiled measuring tape 111. Usually, measuring tape 111 is spring loaded such that measuring tape 111 is retracted into and coiled within housing 110 when no extracting force is applied to measuring tape 111. The leading end 112 of measuring tape 111 extends out of slot 113 in housing 110 and is fitted with end hook 114 which prevents leading end 112 from being retracted into housing 110.

Figure 2:
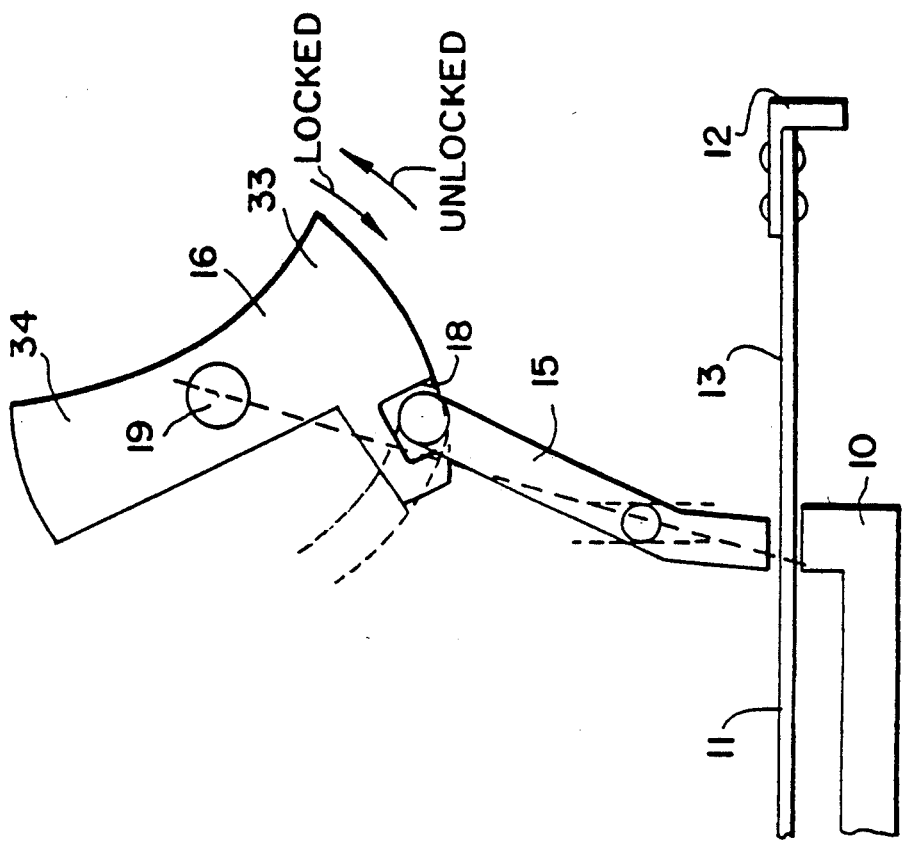
FIGS. 1 and 2 depict prior art mechanisms for locking a tape measure.
Figure 1:
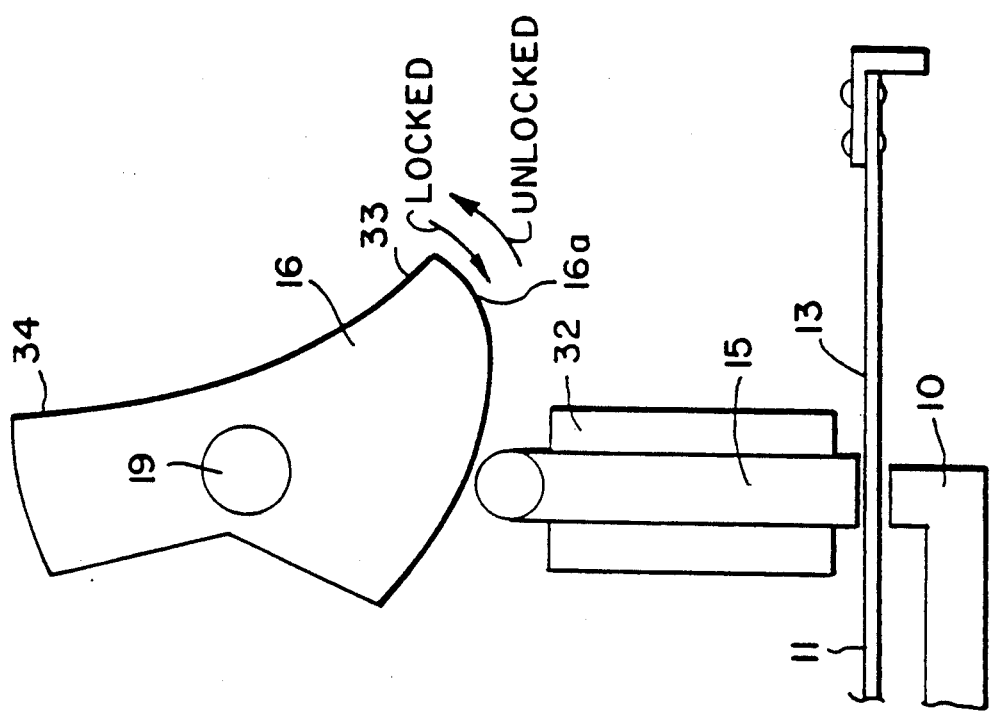

During use, measuring tape 111 is extracted from housing 110 to a desired length. After being pulled to the selected extension, measuring tape 111 can then be locked in such desired position by lock shoe 115, which is mounted within housing 110. In certain embodiments, lock shoe 115 can be sandwiched between two constraining walls in housing 110 similar to those shown in FIG. 1. Lock shoe 15 is typically constructed from plastic or other material of sufficient rigidity to provide force against tape 111 as described herein. Lock shoe 115 is adapted for contacting the upper surface of measuring tape 111 and pressing the lower surface of measuring tape 111 against a portion of housing 110 such that the frictional force applied to measuring tape 111 by lock shoe 115 and housing 110 is sufficient to balance or outweigh the force, if any, acting to retract or extend measuring tape 111 with respect to housing 110. Thus, measuring tape 111 is "locked" in position by the contacting action of lock shoe 115. When contact between lock shoe 115 and measuring tape 111 is released, the retracting force acting on measuring tape 111 is again able to act and retract measuring tape 111.

Lock shoe 115 is contacted with measuring tape 111 by the action of button 116. In FIG. 3, button 116 is a wedge shaped block of plastic or other material having upper, lower, side, front and back surfaces 116a, 116b, 116c, 116d and 116e, respectively. Notch 118 is formed in the lower surface 116b of button 116 and adapted for receiving the end of lock shoe 115 opposite to the end which contacts measuring tape 111. Notch 118 and lock shoe 115 are adapted and fitted together such that depression of button 116 moves lock shoe 115 toward the leading end 112 of measuring tape 111.

Button 116 is mounted within housing 110 by button pivot 119, about which button 116 can rotate. In contrast with toggle-type buttons, button pivot 119 is located near one end of button 116. Button pivot 119 extends through button 116 and fits into corresponding recesses in housing 110. Button 116 is also contacted by or fitted with means for providing a force that resists depression of button 116. In FIG. 3, such force is provided by coiled spring 117 which is supported within housing 110 by spring support 120. Spring 117 provides force against the lower surface 116b of button 116. Alternatively, the resistive force can be provided by a spring which is incorporated within or formed as a part of button 116 such as a leaf spring, or by a lock shoe which is compressible.

Finally, button 116 is attached to locking mechanism 121 that holds lock shoe 115 in contact with measuring tape 111 while the button mechanism is in its locked position. Locking mechanism 121 can be any means which will hold the lock shoe in its locked position when the button mechanism is activated, such as solenoids, magnetic locks, or other means typically employed in similar push on-push off switches. FIGS. 4 and 5 depict one such locking mechanism. Pin 122 extends through slots 123 in the side surfaces 116c of button 116. Each end of pin 122 has a spring loaded telescoping tip 124 which can be extended along the longitudinal axis of pin 122 in order to adjust the effective length of pin 122 to engage and fit between the various surfaces of Y-groove 125 shown in FIG. 5. Y-groove 125 is formed by multiple surfaces 125A through 125O so as to direct button 116 through its resting and activated positions by way of pin 122. Surfaces 125A, 125B, 125D, 125F, 125H, 125I, 125J and 125L are approximately parallel to the longitudinal axis of pin such that when the side of tip 124 of pin 122 abuts such surfaces pin 122 is directed along such surfaces. FIG. 5 also shows four positions 126, 127, 128 and 129 that the tip 124 of pin 122 can assume within Y-groove 125. Position 126 corresponds to the position of pin 122 when button 116 is in the unlocked position. Positions 127 and 129 correspond to alternating positions of pin 122 when button 116 is in the intermediate position. Position 128 corresponds to the position of button 116 in the locked position. One or more of surfaces 125C, 125E, 125G and 125K are inclined in the direction of the indicated positive z-axis. If surface 125C is inclined, position 126 is lower (i.e.—a lesser "z" value) than the edge between surfaces 125C and 125D. If surface 125E is inclined, position 127 is lower than the edge between surfaces 125E and 125H. If surface 125K is inclined, position 129 is lower than the edge between surfaces 125K and 125A.

When the mechanism shown in FIGS. 4 and 5 is used, button 116 begins in the resting or unlocked position and pin 122 is in position 126. As button 116 is depressed from the unlocked position, by force applied at point 135, button 116 rotates clockwise (as shown in FIG. 4) about button pivot 119. As button 116 rotates, tip 124 of pin 122 moves across surface 125C directed by surfaces 125A and 125B. Eventually, tip 124 drops over the edge of surface 125C and telescopes to contact surface 125E. Tip 124 then continues to move across surface 125E directed by surface 125B until tip 124 reaches position 127, an intermediate position of button 116. In this position, rotation of button 116 momentarily stops and changes direction. As button 116 is released, tip 124 moves across surface 125E directed by surfaces 125B and 125D. Eventually, tip 124 drops over the edge of surface 125E and telescopes to contact surface 125G. Tip 124 then moves across surface 125G directed by surface 125D until it reaches position 128, the activated or locked position. Pin 122 is held in the locked position by surfaces 125D and 125F which are appropriately angled with respect to each other such that they form a notch into which tip 124 will fit. The movement of pin 122 from position 126 to position 128 causes lock shoe 115 to contact measuring tape 111, thus locking it in place. If button 116 is again depressed, by force applied to the same point 135, button 116 again rotates clockwise about button pivot 119. As surfaces 125F and 125H. Eventually, tip 124 drops over the edge of surface 125G and telescopes to contact surface 125K. Tip 124 until it reaches position 129, corresponding to the intermediate position of button 116. As button 116 is released, tip 124 moves across surface 125K directed by surfaces 125I, 125J and 125L. Eventually, tip 124 drops over the edge of surface 125K and telescopes to contact surface 125C, thus returning to position 126, the unlocked position. Movement of pin 122 from position 128 to position 126 causes lock shoe 115 to release contact with measuring tape 111, thus unlocking measuring tape 111.

By following this pattern, pin 122 holds button 116 in its two positions—locked or unlocked. Pin 122 is enclosed in slots 123 and is trapped with respect to rotation around the button pivot 119. However, pin 122 is free to move along slots 123 in a radial direction with respect to button pivot 119. Although radial movement is necessary to account for the width of Y-groove 125, it is the resistance of pin 122 to rotation around button pivot 119 that holds button 116 in one position or the other.

Alternative embodiments can employ one, two or more directing means, such as a Y-shaped grooves, for directing the button and locking mechanism through the required positions.

In certain embodiments when moving from position 126 through position 127 to position 128 (and from position 128 through position 129 to position 126), lock shoe 115 "over-travels" in that at position 127 (and 129) the lock shoe 115 is depressed farther than necessary to lock measuring tape 111 in place. Over-travel can cause damage to the measuring tape (e.g., kinks) unless means are provided for absorbing the extra compressive force. Such means could include, for example, a rubber bumper fitted in housing 110 below slot 113, a compressible lock shoe, or a flexible or compressible junction of the button, pin and lock shoe. Each such means, among others, will absorb at least some of the excess force and diminish damage to the tape.

Figure 6:
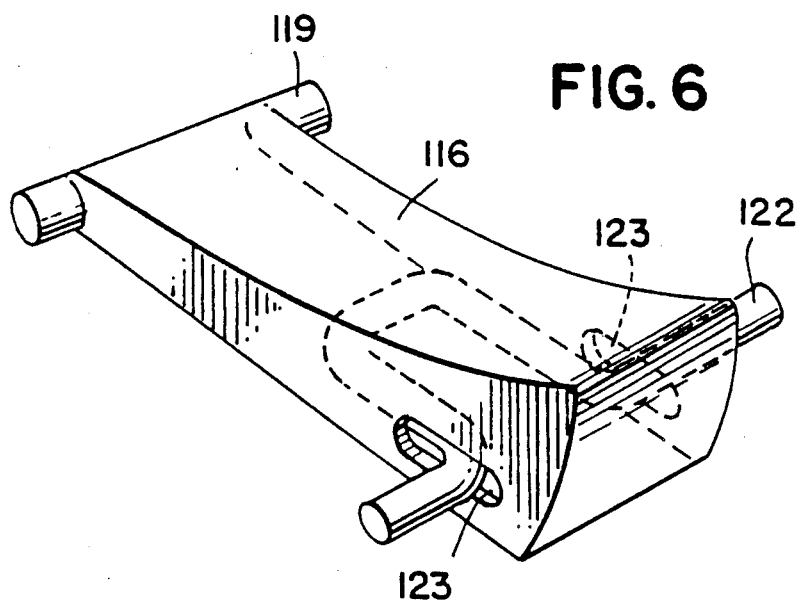
FIG. 6 shows an alternative button construction for use in practicing the present invention.

FIG. 6 shows an alternative embodiment of pin 122. In the depicted embodiment, the pin is not spring loaded to provide telescoping tips. Instead, the pin is bent to provide spring tension that forces the ends of the pin into contact with directing means, such as the Y-shaped grooves previously described.

Figure 7A:
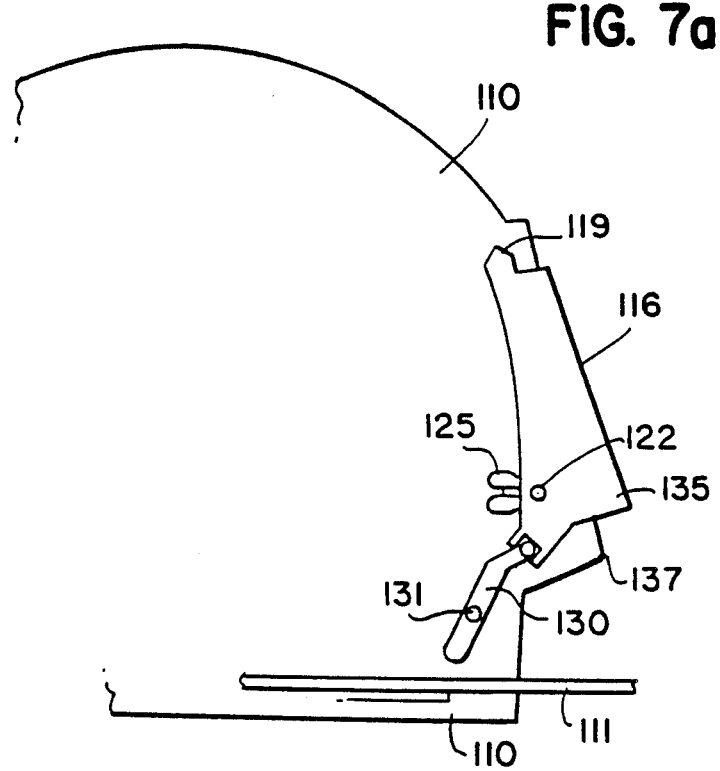
FIGS. 7a and b depict alternative button/lock shoe constructions for use in practicing the present invention.
Figure 7B:
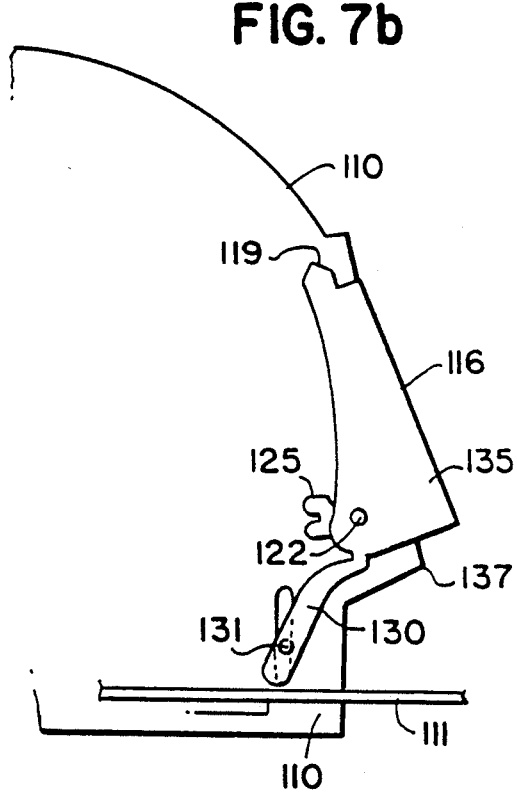
Figure 8:
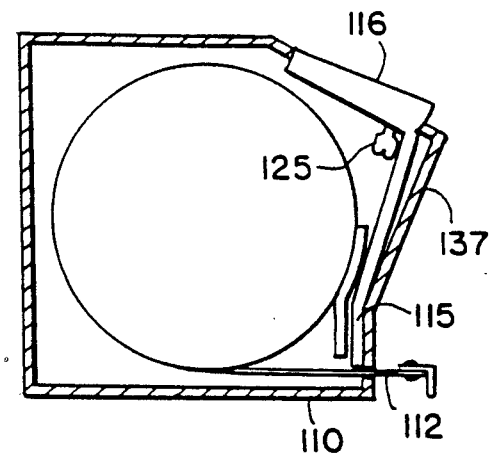

FIGS. 7a and b depict alternative embodiments of the button and lock shoe combination. In FIG. 7a, lock shoe 130 is angled rather than flat. Lock shoe 130 is mounted within housing 110 by pin 131. As button 116 is depressed, lock shoe 130 rotates and slides (about pin 131) until it contacts measuring tape 111. FIG. 7b depicts another alternative embodiment in which lock shoe 130 and button 116 have been formed as a single piece.

FIGS. 8-11 depict alternative embodiments in which the button 116 and lock shoe 115 are oriented in various positions within housing 110.

In other alternative embodiments, the pin or other structure that contacts the directing means can be situated on portions of button 116 other than the sides. For example, a pin could be mounted on front surface 136 of button 116 to engage a Y-shaped groove in the wall 137 of housing 110 through which tape 112 extends.

From the foregoing it will be apparent to those skilled in the art that various modifications in the above-described devices can be made without departing from the scope and spirit of the invention. Accordingly, the invention may be embodied in other specific forms without departing from the spirit or essential characteristics thereof. Present embodiments, therefore, are to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A tape measure comprising:
   a housing;
   a measuring tape contained within said housing;
   a lock shoe mounted within said housing such that said lock shoe can contact said measuring tape so as to press said measuring tape against a portion of said housing; and
   a push on-push off locking mechanism mounted within said housing and in communication with said lock shoe, such that when said locking mechanism is pushed on said lock shoe presses said measuring tape against said housing and when said locking mechanism is pushed off contact between said measuring tape and said housing tape is released;
   wherein said locking mechanism comprises a button rotatably mounted within said housing and adapted for pressing said lock shoe against said housing; and
   wherein said button rotates in the same direction when said locking mechanism is both pushed on and pushed off.

2. The tape measure of claim 1 wherein said button and said lock shoe are formed by a single piece of material.

3. The tape measure of claim 1 wherein said locking mechanism comprises:
   a Y-shaped groove situated within or formed by said housing, said groove defining a resting position and an activated position;
   a button rotatably mounted within said housing, said button being adapted for contacting said lock shoe so as to press said lock shoe into contact with said measuring tape; and
   a pin fitted on or within said button, said pin being adapted for engaging said groove so as to hold said locking mechanism in either the pushed on or pushed off position.

4. A tape measure comprising:
   a housing;
   a measuring tape contained within said housing;
   a lock shoe mounted within said housing such that said lock shoe can contact said measuring tape so as to press said measuring tape against a portion of said housing; and
   a push on-push off locking mechanism mounted within said housing and in communication with said lock shoe, such that when said locking mechanism is pushed on said lock shoe presses said measuring tape against said housing and when said locking mechanism is pushed-off contact between said measuring tape and said housing tape is released;
   wherein said locking mechanism comprises:
   a Y-shaped groove situated within or formed by said housing, said groove defining a resting position and an activated position;
   a button rotatably mounted within said housing, said button being adapted for contacting said lock shoe so as to press said lock shoe into contact with said measuring tape; and
   a pin connected to said button for engaging said groove so as to hold said locking mechanism in either the pushed on or pushed off position; and
   wherein said pin is spring loaded such that the end of said pin is pushed into engagement with said groove.

5. A tape measure comprising:
   a housing;
   a measuring tape contained within said housing;
   a lock shoe mounted within said housing such that said lock shoe can contact said measuring tape so as to press said measuring tape against a portion of said housing; and
   a push on-push off locking mechanism mounted within said housing and in communication with said lock shoe, such that when said locking mechanism is pushed on said lock shoe presses said measuring tape against said housing and when said locking mechanism is pushed-off contact between said measuring tape and said housing tape is released;
   wherein said locking mechanism comprises;
   a Y-shaped groove situated within or formed by said housing, said groove defining a resting position and an activated position;
   a button rotatably mounted within said housing, said button being adapted for contacting said lock shoe so as to press said lock shoe into contact with said measuring tape; and
   a pin fitted on or within said button, said pin being adapted for engaging said groove so as to hold said locking mechanism in either the pushed on or pushed off position; and
   wherein said pin is bent to provide tension which pushes the end of said pin into engagement with said groove.

6. A tape measure comprising:
   a housing;
   a measuring tape contained within said housing;
   a lock shoe mounted within said housing such that said lock shoe can contact said measuring tape so as to press said measuring tape against a portion of said housing; and
   a push on-push off locking mechanism mounted within said housing and in communication with said lock shoe, such that when said locking mechanism is pushed on said lock shoe presses said measuring tape against said housing and when said locking mechanism is pushed off contact between said measuring tape and said housing tape is released;
wherein said locking mechanism comprises:
a Y-shaped groove situated within or formed by said housing, said groove defining a resting position and an activated position;
a button rotatably mounted within said housing, said button being adapted for contacting said lock shoe so as to press said lock shoe into contact with said measuring tape; and
a pin fitted on or within said button, said pin being adapted for engaging said groove so as to hold said locking mechanism in either the pushed on or pushed off position; and
wherein said groove defines a plurality of surfaces oriented so as to direct said pin between said resting and activated positions when said button is depressed.

7. A tape measure comprising:
a housing;
a measuring tape contained within said housing;
a lock shoe mounted within said housing such that said lock can contact said measuring tape so as to press said measuring tape against a portion of said housing;
locking means mounted within said housing and in contact with said lock shoe for locking said lock shoe in contact with said measuring tape, said locking means comprising:
a button pivot mounted within said housing;
a button rotatably mounted on said button pivot near one end of said button, said button being adapted for contacting said lock shoe so as to move said lock shoe into contact with said measuring tape;
directing means situated within or formed by said housing between a resting position and an activated position;
resistive means between said button and said housing for resisting the depression of said button toward said housing;
said button being fitted with engaging means for engaging said directing means such that a first depression and release of said button causes said engaging means to move with respect to said directing means from said resting position and to said activated position causing said lock shoe to contact said measuring tape and press said measuring tape against said housing, and such that a second depression and release of said button toward said housing following said first depression causes said engaging means to move with respect to said directing means from said activated position and to said resting position causing said lock shoe to release contact with said measuring tape.

8. The tape measure of claim 7 wherein said directing means is a Y-shaped groove having surfaces for directing said engaging means between said resting and activated positions.

9. The tape measure of claim 8 wherein said engaging means is a pin fitted on or within said button such that each end of said pin contacts and is directed by said Y-shaped groove when said button is depressed.

10. The tape measure of claim 7 wherein said resistive means is a spring mounted within said locking means.

11. A tape measure comprising:
a housing;
a measuring tape contained within said housing;
a lock shoe mounted within said housing such that said lock can contact said measuring tape so as to press said measuring tape against a portion of said housing;
locking means mounted within said housing and in contact with said lock shoe for locking said lock shoe in contact with said measuring tape, said locking means comprising:
directing means situated within or formed by said housing, said directing means defining a resting position and an activated position;
a button pivot mounted within said housing;
a button rotatably mounted on said button pivot near one end of said button, said button being adapted for contacting said lock shoe so as to move said lock shoe into contact with said measuring tape;
resistive means between said button and said housing for resisting the depression of said button toward said housing;
said button being fitted with engaging means for engaging said directing means such that a first depression and release of said button causes said engaging means to move with respect to said directing means from said resting position and to said activated position causing said lock shoe to contact said measuring tape and press said measuring tape against said housing, and such that a second depression and release of said button toward said housing following said first depression causes said engaging means to move with respect to said directing means from said activated position and to said resting position causing said lock shoe to release contact with said measuring tape;
wherein said directing means is a Y-shaped groove having surfaces for directing said engaging means between said resting and activated positions;
wherein said engaging means is a pin fitted on or within said button such that each end of said pin contacts and is directed by said Y-shaped groove when said button is depressed; and
wherein said pin is spring loaded such that the end of said pin is pushed into engagement with said Y-shaped groove.

12. A tape measure comprising:
a housing;
a measuring tape contained within said housing;
a lock shoe mounted within said housing such that said lock can contact said measuring tape so as to press said measuring tape against a portion of said housing;
locking means mounted within said housing and in contact with said lock shoe for locking said lock shoe in contact with said measuring tape, said locking means comprising:
directing means situated within or formed by said housing, said directing means defining a resting position and an activated position;
a button pivot mounted within said housing;
a button rotatably mounted on said button pivot near one end of said button, said button being adapted for contacting said lock shoe so as to move said lock shoe into contact with said measuring tape;
resistive means between said button and said housing for resisting the depression of said button toward said housing;
said button being fitted with engaging means for engaging said directing means such that a first depression and release of said button causes said engaging means to move with respect to said directing means from said resting position and to said activated position causing said lock shoe to contact said measuring tape and press said measuring tape against said housing, and such that a second depression and release of said button toward said housing following said first depression causes said engaging means to move with respect to said directing means from said activated position and to said resting position causing said lock shoe to release contact with said measuring tape;

wherein said directing means is a Y-shaped groove having surfaces for directing said engaging means between said resting and activated positions;

wherein said engaging means is a pin fitted on or within said button such that each end of said pin contacts and is directed by said Y-shaped groove when said button is depressed; and wherein said pin is bent to provide tension which pushes the end of said pin into engagement with said Y-shaped groove.

* * * * *